Dec. 1, 1970  H. L. PRESCOTT  3,544,884
LOAD TAP CHANGER APPARATUS EMPLOYING PARALLEL CIRCUITS
COMPRISING VACUUM AND NO-LOAD SWITCHES
Filed Dec. 27, 1968  4 Sheets-Sheet 1

WITNESSES:
Bernard R. Giegues
James F. Young

INVENTOR
Herbert L. Prescott
BY
Donald R. Lackey
ATTORNEY

Dec. 1, 1970      H. L. PRESCOTT      3,544,884
LOAD TAP CHANGER APPARATUS EMPLOYING PARALLEL CIRCUITS
COMPRISING VACUUM AND NO-LOAD SWITCHES
Filed Dec. 27, 1968      4 Sheets-Sheet 2
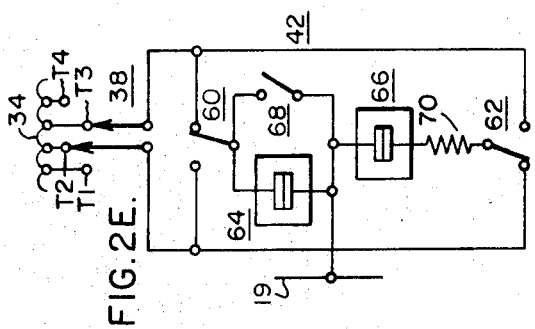
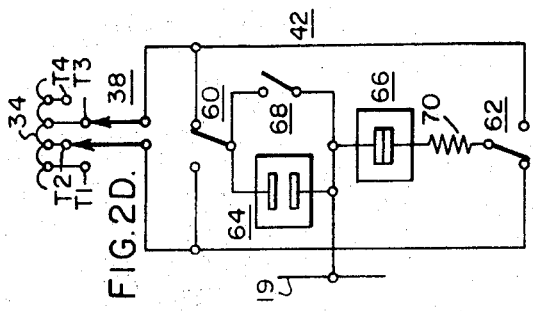
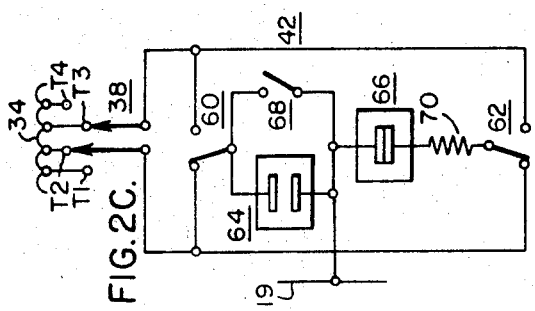
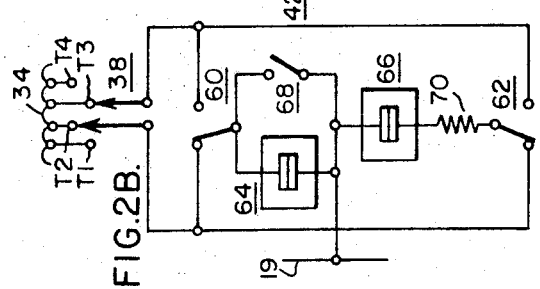
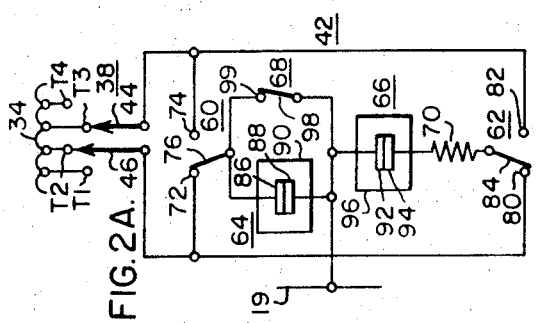
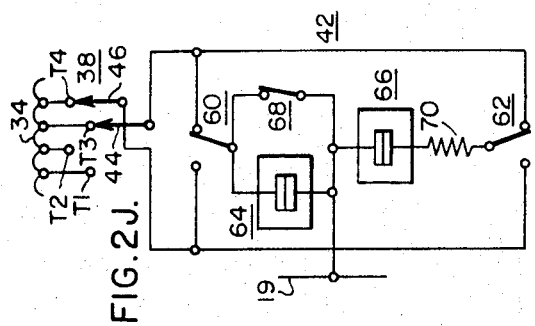
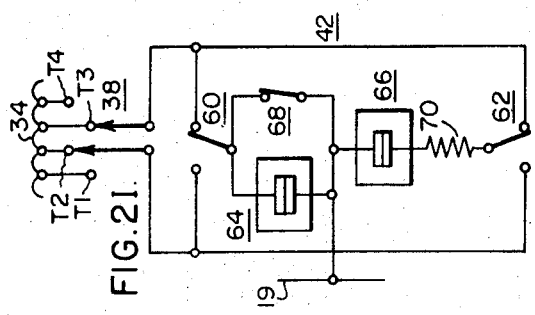
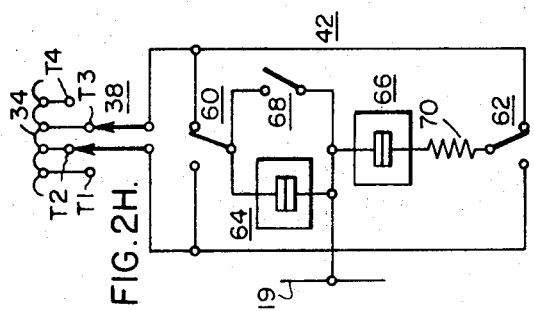
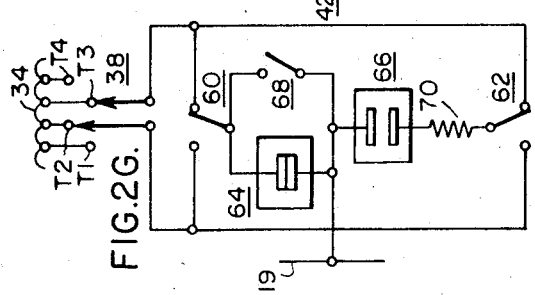
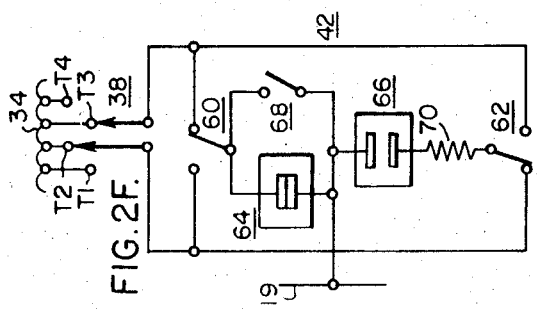

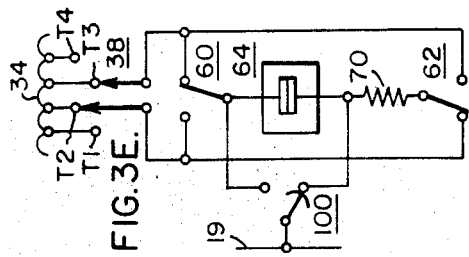
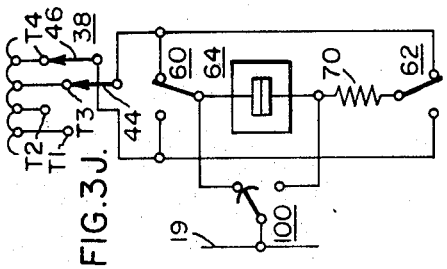
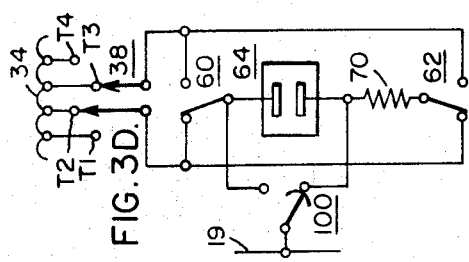
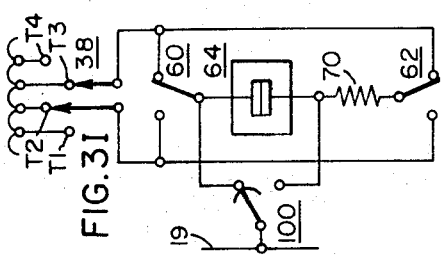
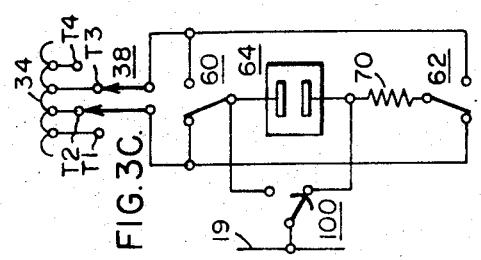
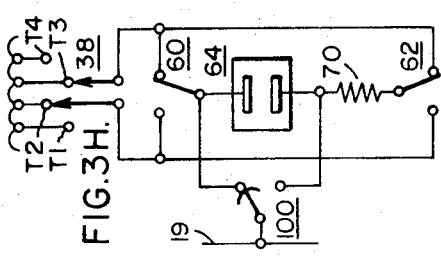
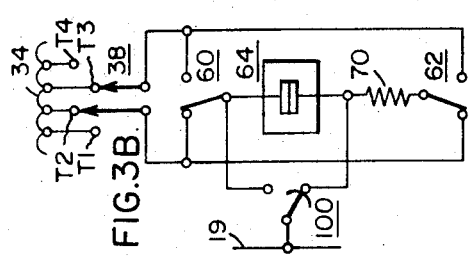
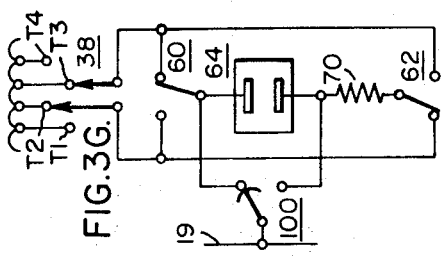
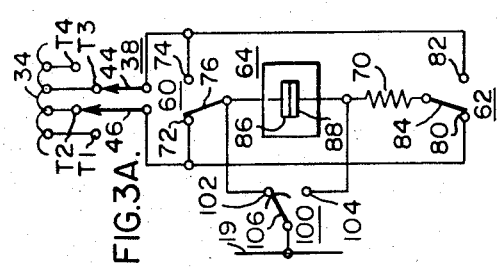
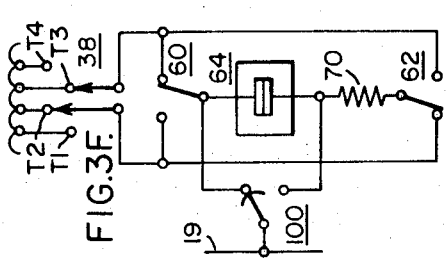

Dec. 1, 1970   H. L. PRESCOTT   3,544,884
LOAD TAP CHANGER APPARATUS EMPLOYING PARALLEL CIRCUITS
COMPRISING VACUUM AND NO-LOAD SWITCHES
Filed Dec. 27, 1968   4 Sheets-Sheet 4

United States Patent Office 3,544,884
Patented Dec. 1, 1970

3,544,884
LOAD TAP CHANGER APPARATUS EMPLOYING PARALLEL CIRCUITS COMPRISING VACUUM AND NO-LOAD SWITCHES
Herbert L. Prescott, Brookfield, Ohio, assignor to Westinghouse Electric Corporation, Pittsburgh, Pa., a corporation of Pennsylvania
Filed Dec. 27, 1968, Ser. No. 787,355
Int. Cl. H02m 5/12; H02p 13/06
U.S. Cl. 323—43.5
19 Claims

ABSTRACT OF THE DISCLOSURE

Load tap changer apparatus of the impedance type, wherein an impedance is connected into the circuit during a tap change to limit the current magnitude when two adjacent winding taps are both electrically connected in the circuit. The tap changer apparatus includes a combination of vacuum and no-load switches, which are actuated in a predetermined sequence to effect a tap change without contaminating the fluid dielectric associated with the tap changer apparatus.

BACKGROUND OF THE INVENTION

Field of the invention

The invention relates in general to load tap changer apparatus, and more specifically to tap changer apparatus of the impedance or resistive type.

Description of the prior art

Load tap changing systems of the impedance or resistive type bridge a resistor across the tapped section of the associated electrical winding, when adjacent winding taps are both connected into the circuit during the transition period of changing taps. The resistor limits the current flow during this transition period, while load transfer switches are being sequentially operated to effect the desired tap change without interrupting the circuit between the electrical winding and the load. U.S. Pat. 3,312,793, assigned to the same assignee as the present application, describes in detail a load tap changer of this type.

Although the load circuit is not interrupted during a tap change by the load tap changer, parallel circuits are interrupted by load transfer switches in the tap changer, which produce arcing and resulting decomposition of the fluid dielectric disposed in the tap changer tank, as well as vaporizing a portion of the switch contacts. The by-products of this decomposition of the fluid dielectric, such as oil, $SF_6$ or the synthetic liquids formulated of chlorinated diphenyl and trichlorobenzene, are corrosive and deleteriously affect the insulating qualities of the fluid. The fine metallic particles from the switch contacts, due to the arc corrosion, also adversely affect the insulating qualities of the fluid dielectric.

To escape the corrosive action of the by-products of the decomposed fluid dielectric, as well as the reduction in the electrical insulating strength of the fluid dielectric, the no-load tap selector switch is usually disposed in a separate compartment in the tap changer, and the compartment containing the load transfer switches is insulated and shielded to provide the necessary clearances and creep distances dictated by the operating voltage and the insulating strength of the fluid dielectric as it will be eventually modified by the arc heat generated byproducts. Thus, load tap changers could be substantially reduced in size and cost if contamination of the fluid dielectric due to the arc heat by-products could be economically eliminated.

SUMMARY OF THE INVENTION

Briefly, the present invention is a new and improved tap changer system of the resistive type, which utilizes vacuum circuit interrupters or switches in combination with no-load tap selector and no-load transfer switches, to effect tap changes while confining arcing to the vacuum switches. Thus, the arc heat is contained in the vacuum interrupter cylinder, and there is no decomposition of the fluid dielectric or erosion of exposed contacts. The tap changer system includes a no-load tap selector switch having a plurality of stationary contacts connected to an electrical winding, two movable contact arms for sequentially engaging certain of the stationary contacts, a resistor, an output terminal, and means including vacuum and no-load type transfer switches for providing first, second and third parallel circuits between each of the two movable contact arms and the output terminal. The vacuum and no-load switches of the parallel connected circuits are opened and closed in a predetermined sequence to switch the output terminal from one winding tap to another, without interrupting the circuit between the winding and the load, and without excessive current flow during the time that the two adjacent winding taps are electrically connected to the load circuit.

BRIEF DESCRIPTION OF THE DRAWINGS

Further advantages and uses of the invention will become more apparent when considered in view of the following detailed description and drawings, in which:

FIG. 2A through 2J are schematic diagrams which illustrate the steps of a tap change, using the tap changer system shown in FIG. 1;

FIGS. 3A through 3J are schematic diagrams which illustrate the steps of a tap change with a resistive type tap changer arrangement constructed according to another embodiment of the invention, which utilizes one vacuum interrupter.

DESCRIPTION OF PREFERRED EMBODIMENTS

Figure 1:
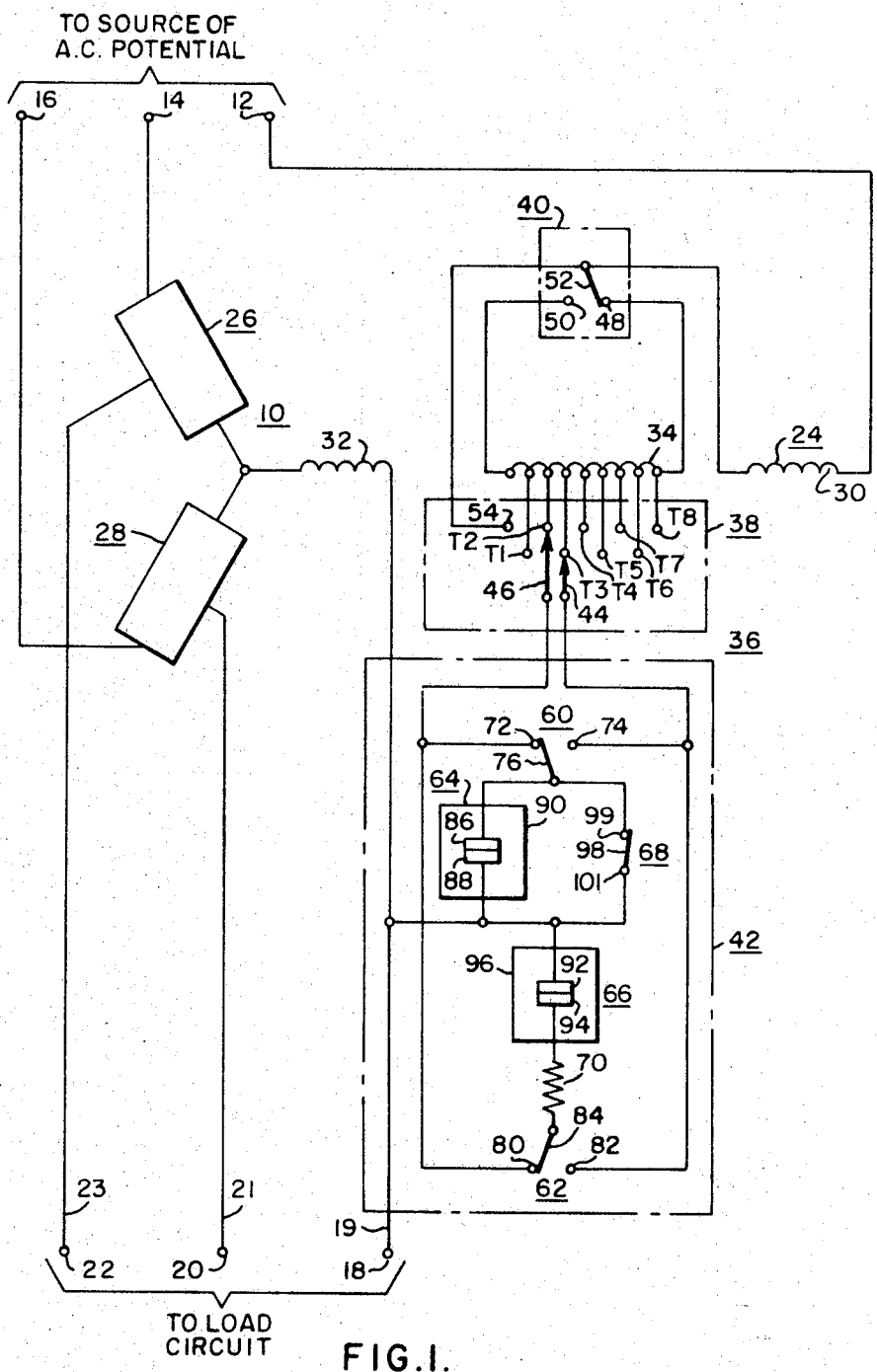
FIG. 1 is a schematic diagram illustrating a transformer having a tapped winding section and a load tap changer system of the resistive type, constructed according to an embodiment of the invention which utilizes two vacuum interrupters.

Referring now to the drawings, and FIG. 1 in particular, there is illustrated a schematic diagram of a three-phase transformer 10 of the autotransformer type, which may utilize a resistive type load tap changer system constructed according to the teachings of the invention. Transformer 10 is shown as being three-phase, but it will be understood that the invention may be used with single or polyphase inductive apparatus. Further, while transformer 10 is illustrated as being of the autotransformer type, it may also be of the isolated winding type.

Specifically, transformer 10 includes line terminals 12, 14 and 16 for connection to a source of alternating potential (not shown), and terminals 18, 20 and 22 for connection to a load circuit (not shown). In general, transformer 10 has phase winding portions 24, 26 and 28. Since the phase winding portions are similar to one another, only phase winding portion 24 will be described in detail. Phase winding portion 24 includes a high voltage section 30, a low voltage section 32, a tapped section 34 having a plurality of taps such as T1, T2, T3, T4, T5, T6, T7 and T8, and a tap changer system 36 for adjusting the voltage which appears at the low voltage output terminal 18. The phase winding portions 24, 26 and 28 are connected to the low voltage output terminals 18, 20 and 22 via electrical conductors 19, 21 and 23, respectively.

Tap changer system 36 for adjusting, under load, the voltage which appears at output terminal 18, includes a no-load type tap selector switch 38 for selecting the various taps on tapped winding section 34, a no-load type reversing switch 40 for reversing the polarity of tapped winding section 34, and transfer switching means 42.

The selector switch 38 may be of the type which has a plurality of stationary contacts disposed in two concentric circles, with one circle of contacts being connected to the even numbered taps on tapped winding section 34, and the other circle of contacts being connected to the odd numbered taps. The selector switch 38 has two movable contacts 44 and 46, which selectively and sequentially contact certain of the stationary contacts. Movable contact 44 moves in the circle of odd numbered contacts, and movable contact 46 moves in the circle of the even numbered contacts. The movable contacts 44 and 46 of selector switch 38 are connected to transfer switching means 42, and are suitably interlocked to allow only the movable contact not connected to the circuit by transfer switching means 42, to break connection with one of the taps on tapped winding section 34.

The reversing switch 40 is a single pole, double throw switch, having stationary contacts 48 and 50 connected to the ends of tapped winding section 34, and a movable contact 52 connected to winding section 30 and to a stationary contact 54 in selector switch 38. The reversing switch 40 is suitably interlocked to allow it to be operated only when movable contact 46 of selector switch 38 is connected to stationary contact 54 and to the terminal 18, through transfer switching means 42. Thus, the tapped winding section 34 is moved from the circuit when the reversing switch 40 is operated.

In the prior art, the transfer switching means 42 and the tap selector switch 38 are disposed in separate fluid filled compartments of a suitable casing or tank, which complicate the electrical interconnections between them, and the electrical clearances in the compartment for the transfer switching means are in excess of those normally required for the voltage class, due to the deleterious effects on the fluid dielectric by the by-products generated by the arcing of the transfer switching means during an under load tap change. The transfer switching means 42, shown in FIG. 1, which is constructed according to the teachings of the first embodiment of the invention, does not liberate any arcing by-products into the fluid dielectric, therefore, making it unnecessary to separate the components of the switching system into separate compartments, and it also enables normal insulating clearances to be used.

More specifically, transfer switching means 42 includes first and second no-load type transfer switches 60 and 62, respectively, first and second vacuum type circuit interrupters or switches 64 and 66, respectively, a no-load by-pass switch 68, and impedance means such as resistor 70.

Transfer switch 60 is a no-load type single pole, double throw switch having first and second stationary contacts 72 and 74, which are connected to the movable contact arms 46 and 44, respectively, of the tap selector switch 38, and movable contact means or arm 76 which switches from one stationary contact to the other, when actuated. Thus, transfer switch 60 has first and second positions, with the first position being when the movable contact arm 76 engages stationary contact 72, and the second position being when the movable contact arm 76 engages stationary contact 74.

Transfer switch 62 is similar to transfer switch 60, having first and second stationary contacts 80 and 82 connected to the movable contact arms 46 and 44, respectively, of the tap selector switch 38, and a movable contact arm 84 which switches from one stationary contact to the other when actuated. Transfer switch 62 has first and second positions, with the first position being when the movable contact arm engages stationary contact 80, and the second position being when the movable contact arm contacts stationary contact 82.

Vacuum interrupter 64 is an arcing duty vacuum type switch having first and second contacts 86 and 88 disposed within an evacuated envelope 90, with one of the contacts being movable through a sealed bellows, in a manner well known in the art.

Vacuum interrupter 66 is similar in construction to the vacuum interrupter 64, having first and second contacts 92 and 94 disposed within an evacuated envelope 96, with one of the contacts being movable relative to the other through a sealed bellows.

The no-load by-pass switch 68 is a single pole, single throw type switch having a movable contact 98 which opens and closes a circuit between its two terminals 99 and 101 when actuated.

The transfer switching means 42, in this embodiment of the invention, as well as in the other embodiments which will be hereinafter described, has its vacuum switches and its no-load switches connected to provide at least three parallel circuits between each of the movable contact arms 46 and 44 and the output terminal 18. In general, the first circuit associated with each movable contact arm includes no-load switching means, the second circuit associated with each movable contact arm includes vacuum switching means, and the third circuit associated with each contact arm includes vacuum switching means and impedance means. The various switches of the transfer switching means 42, the tap selector switch 38 and the reversing switch 40 are all disposed within a common tank or enclosure containing an insulating dielectric fluid such as oil or $SF_6$, and the switches are mechanically interconnected and driven by a reversible drive means (not shown) in response to a regulator system (not shown), which is responsive to the parameter to be regulated. Since the invention relates specifically to a load tap changer system and its construction, the details of the regulator system and drive system are not shown, as suitable regulator and drive systems are well known in the art.

Specifically, in the embodiment of the invention shown in FIG. 1, the first circuit associated with movable contact arm 46 includes the position of no-load transfer switch 60 which includes stationary contact 72, and the no-load by-pass switch 68. The first circuit associated with movable contact arm 44 includes the position of no-load transfer switch 60 which includes stationary contact 74, and the no-load by-pass switch 68. The second circuit associated with movable contact arm 46 includes the position of no-load transfer switch 60 which includes stationary contact 72, and vacuum interrupter 64. The second circuit associated with movable contact arm 44 includes the position of transfer switch 60 which includes stationary contact 74, and the vacuum interrupter 64. The third circuit associated with movable contact arm 46 includes the position of no-load transfer switch 62 which includes stationary contact 80, impedance means or resistor 70, and vacuum interrupter 66. The third circuit associated with movable contact arm 44 includes the position of no-load transfer switch 62 which includes stationary contact 82, resistor 70, and vacuum interrupter 66.

In the operation of the tap changer system 36, the first, second and third circuits associated with each of the movable contact arms 46 and 44 are opened and closed in a predetermined sequence, to effectively change the connection of terminal 18 from one wniding tap to another. For purposes of example, it will be assumed that terminal 18 is electrically connected to tap T2 through movable contact arm 46, and that the regulator system signals the tap changer system 36 to operate at a higher numbered tap. When the tap changer system is operating in a steady state condition, all three of the parallel circuits associated with the movable contact arm connected to the desired operating tap are closed, and the three circuits associated with the other movable contact arm are open. The various sequential steps of the complete tap change for the tap changer system 36 shown in FIG. 1 are shown in FIGS. 2A through 2J, which are schematic diagrams illustrating the tap selector switch 38, a portion of tapped winding 34, and the transfer switching means 42.

FIG. 2A illustrates the steady state operating condition when tap T2 is connected to conductor 19, and thus to terminal 18, via the movable contact arm 46 and its three associated parallel circuits. The current will divide among the three parallel circuits according to their relative impedances, with most of the current flowing through the first and second circuits which include the by-pass switch 68 and the vacuum switch 64, respectively, with a relatively small portion of the current flowing through the third circuit due to the resistor 70. The function of by-pass switch 68 is to parallel vacuum switch 64 to permit a higher continuous current rating and short circuit withstand current.

As illustrated in FIG. 2B, the first step in the tap change cycle, wherein the conductor 19 is to be switched from tap T2 to tap T3, is to open the first closed circuit by opening the no-load by-pass switch 68. Since the load circuit is still maintained through the second circuit via the vacuum switch 64, the by-pass switch 68 may be opened with negligible arcing. This is true, since the impedances of both the first and second circuits should be substantially the same. The next step, illustrated in FIG. 2C, is to open the second closed circuit by opening the vacuum interrupter 64. The load circuit is now maintained entirely through the third closed circuit, but since the impedances of the second and third circuits are substantially different, arcing will occur in the vacuum switch 64 when it interrupts the second circuit. However, since the arcing occurs in a vacuum, it will be brief with very little contact erosion. Further, the arcing being confined to the evacuated envelope, prevents the arc heat from contacting the fluid dielectric and breaking down the dielectric into the undesirable by-products. Therefore, the insulating strength of the fluid dielectric is unaffected by the arcing which occurs within the vacuum interrupter 64.

The next step in the tap change cycle is to actuate the no-load transfer switch 60, switching movable contact 76 from stationary contact 72 to stationary contact 74. This step is illustrated in FIG. 2D. The next step, illustrated in FIG. 2E, closes the vacuum switch 64 to close the initially open second circuit associated with movable contact arm 44. Now, both taps T2 and T3 are connected to conductor 19, but resistor 70 bridges these two taps and limits the magnitude of the current flow due to the "shorting" of the portion of the tapped winding between these two taps. The originally closed third circuit may now be opened, as shown in FIG. 2F, by opening vacuum switch 66. The circuit between the winding and load will still be maintained, through the second circuit associated with movable contact arm 44. Arcing in vacuum switch 66, when it interrupts the initially closed third circuit, will be contained as hereinbefore described relative to the operation of vacuum switch 64. Transfer switch 62 is then actuated, as shown in FIG. 2G, to switch its movable contact arm 84 from stationary contact 80 to stationary contact 82. The next step, as shown in FIG. 2H, is to close the third circuit associated with the movable contact arm 44, by closing the vacuum interrupter 66. The first circuit associated with movable contact arm 44 is then closed, as shown in FIG. 2I, by closing the by-pass switch 68. If the voltage regulator system continues to call for a voltage associated with a still higher tap, movable contact arm 46, as shown in FIG. 2J, may move to contact T4 without arcing; or if the voltage regulator system calls for the circuit to return to tap T2, movable contact arm 46 will remain on tap T2. In either event, the next tap change will include the steps of sequentially opening the first and second circuits associated with movable contact arm 44, closing the second circuit associated with movable contact arm 46, opening the third circuit of movable contact arm 44, and sequentially closing the third and first circuits of movable contact arm 46.

FIGS. 3A through 3J are schematic diagrams which illustrate the tap changing cycle or sequence for a tap changer system constructed according to another embodiment of the invention. The embodiment of the invention shown in FIGS. 3A through 3J is similar to the embodiment of the invention shown in FIG. 1 and FIGS. 2A through 2J, except vacuum switch 66 and by-pass switch 68 have been eliminated by adding make-before-break switch 100, which has stationary contacts 102 and 104 and a movable contact arm 106. When switch 100 is actuated, its movable contact arm 106 engages the free stationary contact before it breaks contact with the other stationary contact. In the embodiment of the invention shown in FIGS. 3A through 3J, the single vacuum switch 64 alternately performs the functions of the vacuum switches 64 and 66 shown in FIGS. 2A through 2J. Like reference numerals in the various figures refer to like components.

More specifically, as shown in FIGS. 3A through 3J, each movable contact arm has three parallel circuits associated with it, with the first circuit of movable contact arm 46 including the position of transfer switch 60 which includes stationary contact 72 and the position of switch 100 which includes stationary contact 102. The first circuit associated with movable contact arm 44 includes the position of transfer switch 60 which includes the stationary contact 74, and the position of switch 100 which includes stationary contact 102. The second circuit associated with movable contact arm 46 includes the position of transfer switch 60 which includes stationary contact 72, the vacuum interrupter 64, and the position of switch 100 which includes stationary contact 104. The second circuit associated with movable contact arm 44 includes the position of transfer switch 60 which includes stationary contact 74, vacuum interrupter 64, and the position of switch 100 which includes its stationary contact 104. The third circuit associated with movable contact arm 46 includes the position of transfer switch 62 which includes stationary contact 80, the impedance means or resistor 70, the vacuum switch 64, and the position of switch 100 which includes its stationary contact 102. The third circuit associated with movable contact arm 44 includes the position of transfer switch 62 which includes its stationary contact 82, resistor 70, vacuum switch 64, and the position of switch 100 which includes its stationary contact 102.

As illustrated in FIG. 3A, when the circuit is in a steady state condition, operating on a predetermined tap, such as tap T2, the first and third circuit associated with the electrically connected tap are closed, while its associated second circuit is opened, and all three circuits associated with the other movable contact arm are open.

In the operation of the tap changer system shown in FIGS. 3A through 3J, it will be assumed that the regulator means has signaled the tap changer to operate on a higher numbered tap. The first step of the tap change cycle, as shown in FIG. 3B, is to open the first circuit associated with movable contact arm 46 by actuating switch 100 to change its operating arm from stationary contact 102 to stationary contact 104. Since switch 100 is of the make-before-break type, it will open the first circuit and close the second circuit, without arcing. When switch 100 is changed from stationary contact 102 to stationary contact 104, the third circuit associated with movable contact arm 46 is modified, by changing the vacuum switch from the third circuit to the second circuit. The third circuit still includes the resistor 70. The next step, shown in FIG. 3C, is to open the second circuit by opening the vacuum switch 64, which still maintains the circuit between the winding and load through the modified third circuit. The arcing during this step is confined to the vacuum chamber or envelope of the vacuum switch 64. Transfer switch 60 is then actuated, as shown in FIG. 3D, moving its movable contact are 76 from stationary contact 72 to stationary contact 74, and then vacuum switch 64 is closed, as shown in FIG. 3E, to close the second circuit asociated with movable contact arm 44. Both taps T2 and T3 are now connected electrically in the circuit, but they are bridged by the resistor 70 which limits the magnitude of the circulating current flow. Switch 100 is then actuated, as shown in FIG. 3F, to return its movable contact arm to stationary contact 102, which closes the first circuit associated with movable contact arm 44, opens the second circuit associated with movable contact arm 44, and returns the vacuum switch 64 to the third circuit associated with contact arm 46. Vacuum switch 64 then opens, as shown in FIG. 3G, to open the third circuit associated with contact arm 46, and transfer switch 62 is actuated, as shown in FIG. 3H, to move its movable contact arm 84 from stationary contact 80 to stationary contact 82. Vacuum switch 64 is then closed, as shown in FIG. 3I, to close the third circuit associated with contact arm 44, and, as shown in FIG. 3J, movable contact arm 46 may now be moved to tap T4, if desired. If it is desired to move the tap connection back to tap T2, the sequence shown in FIGS. 3A through 3J will be followed, except the circuits opened and closed would be associated with the opposite movable contact arm.

FIGS. 4A through 4I are schematic diagrams which illustrate the tap changing steps of still another embodiment of the invention. The embodiment of the invention shown in FIGS. 4A through 4J is similar to the embodiment shown in FIGS. 1 and 2A through 2J, with the following changes. The transfer switch 60 is eliminated, the vacuum switch 64 is replaced by two vacuum switches 110 and 112, and by-pass switch 68 is replaced by a by-pass switch 114 of a different type.

Vacuum switch 110 includes contacts 116 and 118 disposed within an evacuated envelope 110, vacuum switch 112 includes contacts 122 and 124 disposed within an evacuated envelope 126, and the two vacuum switches are serially connected across the movable contact arms 46 and 44. Thus, as shown in FIG. 4A, contact 116 of vacuum switch 110 may be connected to movable contact arm 46, contact 118 of vacuum switch 110 may be connected to contact 122 of vacuum switch 112 at terminal 129, and contact 124 of vacuum switch 112 may be connected to movable contact arm 44.

The new by-pass switch 114 is of the single pole, double throw type, having stationary contacts 128 and 130, and a movable contact 132 which is connected to the terminal 129 between the vacuum switches 110 and 112. Thus, the by-pass switch 114 can parallel either vacuum switch 110 or vacuum switch 112, or it can be placed in a neutral position with the parallel circuits about each vacuum switch being open. Vacuum switch 66 is connected to the junction 129 between the vacuum switches 110 and 112, and to conductor 19.

Similar to the embodiments of the invention hereinbefore described, each movable contact arm has three parallel circuits connected to conductor 19, with the first circuit associated with movable contact arm 46 including the position of by-pass switch 114 which includes stationary contact 128, and the first circuit associated with movable contact arm 44 including the position of by-pass switch 114 which includes stationary contact 130. The second circuit associated with movable contact arm 46 includes vacuum switch 110, and the second circuit associated with movable contact arm 44 incldes vacuum switch 112. The third circuit associated with movable contact arm 46 includes the position of transfer switch 62 which includes stationary contact 80, resistor 70, and vacuum switch 66. The third circuit associated with movable contact arm 44 includes the position of transfer switch 62 which includes stationary contact 82, resistor 70 and vacuum switch 66.

Figure 4E:
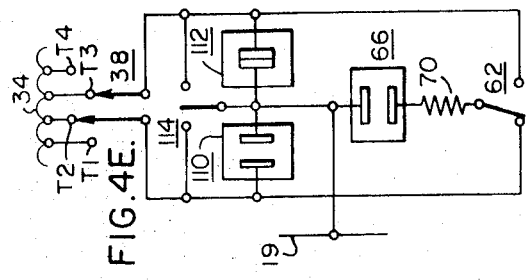
FIGS. 4A through 4I are schematic diagrams which illustrate the steps of a tap change with a resistive type load tap changer arrangement constructed according to another embodiment of the invention, which utilizes three vacuum interrupters.
Figure 4D:
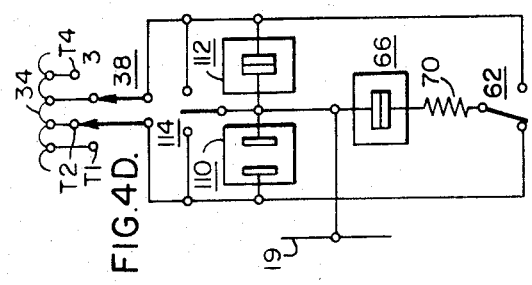
Figure 4I:
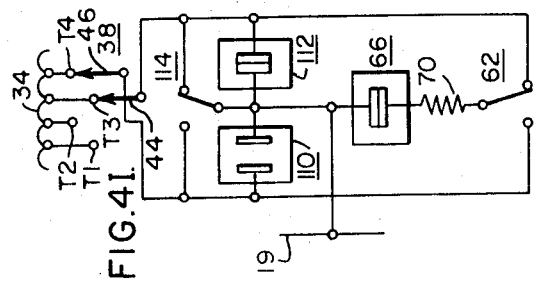
Figure 4C:
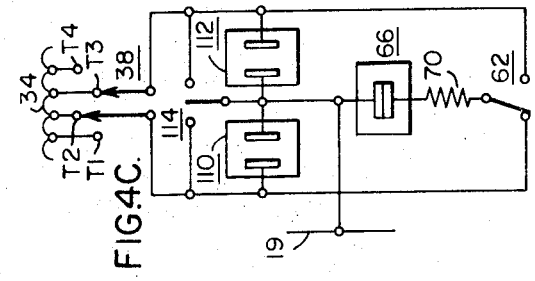
Figure 4H:
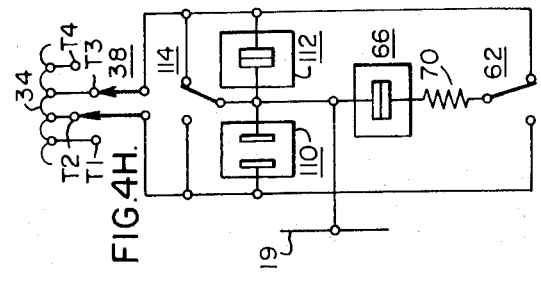
Figure 4B:
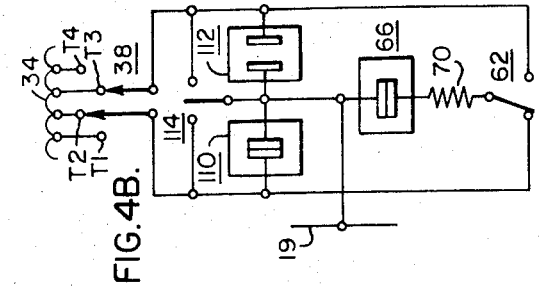
Figure 4G:
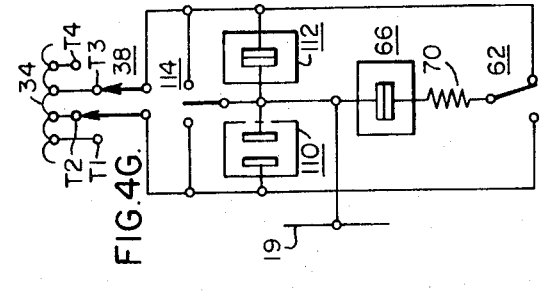
Figure 4A:
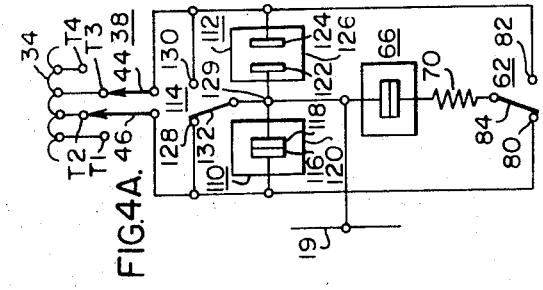
Figure 4F:
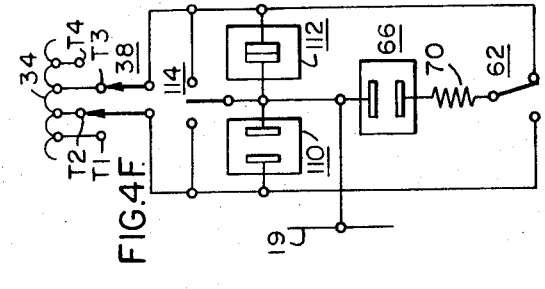

In the operation of the tap changer system shown in FIGS. 4A through 4I, it will be assumed that the regulator system signals the tap changer system to change from tap T2 to tap T3. Initially, as shown in FIG. 4A, all three parallel circuits associated with movable contact 46 and tap T2 are closed, and the three circuits associated with contact arm 44 are open. The first step in the tap change cycle, as shown in FIG. 4B, is to open the first circuit associated with contact arm 46 by moving by-pass switch 114 to its neutral position. The next step, shown in FIG. 4C, is to open the initially closed section circuit by opening the vacuum interrupter 110, which maintains the circuit between the winding and load through the initially closed third circuit. The next step, shown in FIG. 4D closes the second circuit associated with contact arm 44, by closing the vacuum interrupter 112. At this stage of the tap change cycle, both taps T2 and T3 are electrically connected in the circuit, with the resistor 70 limiting the magnitude of the circulating current between the taps. The next step, shown in FIG. 4E, opens the third circuit associated with movable contact arm 46, by opening the vacuum interrupter 66, which confines the arc to the evacuated envelope, and maintains the circuit through the second circuit of contact arm 44. Then, as shown in FIG. 4F, transfer switch 62 is actuated to move its movable contact arm from stationary contact 80 to stationary contact 82. The next step, shown in FIG. 4G, closes the third circuit of contact arm 44 by closing vacuum interrupter 66. Then as shown in FIG. 4H, the first circuit of contact arm 44 is closed by moving contact arm 132 of the by-pass switch to engage its stationary contact 130. As shown in FIG. 4I, movable contact arm 46 is now free to move to tap connection T4, if desired, without arcing.

In the embodiment of the invention shown in FIGS. 2A through 2J, and FIGS. 4A through 4I, the by-pass switches 68 and 114, respectively, may be eliminated, if the additional current capacity provided by these switches is not required. In this instance, each movable contact arm of the tap selector switch 38 would have two parallel circuits connected to the output terminal, instead of three, and the operating sequences hereinbefore described for these embodiments would be the same except for the elimination of the first circuits.

In summary, there has been disclosed new and improved load tap changing system of the resistive type, which have many advantages over similar tap changing systems of the prior art. By using vacuum switches in combination with no-load transfer and by-pass switches, the contamination of the fluid dielectric associated with the tap changer is completely eliminated, through circuit arrangements in which all arcing is confined to the vacuum switches. Thus, the tap changer system may be simplified, as separate compartments in the tap changer are not required to isolate the fluid dielectric and contact metals decomposed by the arc, and the electrical clearances within the tap changer may be reduced since the fluid dielectric will not deteriorate in electrical strength.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. Tap changer apparatus, comprising:
tap selector means having a plurality of stationary contacts adapted for connection to taps on an electrical winding, and first and second contact means for selectively engaging certain of the stationary contacts, terminal means,
means providing first, second, and third circuits in parallel between said first contact means and said terminal means, including no-load switching means in the first circuit, vacuum switching means in the second circuit, and impedance means in the third circuit,
means providing first, second, and third circuits in parallel between said second contact means and said terminal means, including no-load switching means in the first circuit, vacuum switching means in the second circuit, and impedance means in the third circuit,
and means for switching said terminal means from one tap on the electrical winding to another, by switching the first, second and third circuits associated with each of said first and second contact means in a predetermined sequence.

2. The tap changer apparatus of claim 1 wherein the predetermined sequence starts with the first, second and third circuits associated with one of the contact means being closed, and the first, second and third circuits associated with the other contact means being open, and wherein the means for switching the terminal means from one tap to another sequentially opens the closed first circuit, opens the closed second circuit, closes the initially open second circuit, opens the closed third circuit, closes the initially open third circuit, and closes the initially open first circuit.

3. The tap changer apparatus of claim 1 wherein the predetermined sequence starts with the first and third circuits associated with one of the contact means being closed and the second circuit being open, and the first, second and third circuits associated with the other of the contact means being open, and wherein the means for switching said terminal means from one tap to another sequentially closes the initially open second circuit associated with said one contact means, opens the closed first circuit, opens the newly closed second circuit, closes the initially open second circuit, closes the initially open first circuit, opens the newly closed second circuit, opens the closed third circuit, and closes the initially open third circuit.

4. The tap changer apparatus of claim 1 wherein the no-load switching means in the first circuit associated with one of the contact means includes a first position of a first transfer switch and a no-load by-pass switch, and the no-load switching means in the first circuit associated with the other contact means includes a second position of said first transfer switch and said no-load by-pass switch.

5. The tap changer apparatus of claim 4 wherein the second circuit associated with the first contact means includes the first position of the first transfer switch, and the second circuit associated with the second contact means includes the second position of the first transfer switch, and wherein the vacuum switching means of the second circuits associated with the first and second contact means is a first vacuum switch common to both circuits.

6. The tap changer apparatus of claim 5 wherein the third circuits associated with the first and second contact means include first and second positions of a second transfer switch, respectively, a second vacuum switch which is common to both circuits, and the impedance means includes a resistor which is common to both circuits.

7. The tap changer apparatus of claim 1 wherein the no-load switching means in the first circuit associated with one of the contact means is one position of a double throw switch, and the no-load switching means in the first circuit associated with the other contact means is another position of said double throw switch.

8. The tap changer apparatus of claim 7 wherein the vacuum switching means of the second circuit associated with one of the contact means is a first vacuum switch, and the vacuum switching means of the second circuit associated with the other contact means is a second vacuum switch.

9. The tap changer apparatus of claim 8 wherein the third circuits associated with the first and second contact means includes first and second positions of a second transfer switch, respectively, and a third vacuum switch which is common to both circuits, and wherein the impedance means of the third circuits is a single impedance which is common to both circuits.

10. The tap changer apparatus of claim 1 wherein the no-load switching means in the first circuit associated with one of the contact means includes a first position of a first transfer switch, and the first position of a make-before-break switch, and the no-load switching means in the first circuit associated with the other contact means includes a second position of said first transfer switch, and the first position of said make-before-break switch.

11. The tap changer apparatus of claim 10 wherein the vacuum switching means of the second circuits associated with the first and second contact means is a first vacuum switch common to both circuits, and wherein the second circuits associated with the first and second contact means include the first and second positions of the first transfer switch, respectively, and a second position of the make-before-break switch.

12. The tap changer apparatus of claim 11 wherein the third circuits associated with the first and second contact means include first and second positions of a second transfer switch, respectively, and wherein the impedance means of the third circuit is a single impedance common to both circuits.

13. Tap changer apparatus, comprising:
tap selector means having a plurality of stationary contacts adapted for connection to taps on an electrical winding, and first and second movable contact means for selectively engaging said stationary contacts, terminal means,
means providing first and second circuits in parallel between said first movable contact means and said terminal means, including vacuum switching means in the first circuit, and vacuum switching means, impedance means, and a first position of a no-load transfer switch in the second circuit,
means providing first and second circuits in parallel between said second movable contact means and said terminal means, including vacuum switching means in the first circuit, and vacuum switching means, impedance means, and a second position of said no-load transfer switch in the second circuit,
and means for switching said terminal means from one tap on the electrical winding to another, by switching the first and second circuits associated with each of said first and second movable contact means in a predetermined sequence.

14. The tap changer apparatus of claim 13 wherein the vacuum switching means of the first circuits of the first and second movable contact means is a single vacuum switch common to both circuits, and including a no-load transfer switch having first and second positions, the first circuits of the first and second movable contact means being connected between their respective movable contact means and the terminal means through the first and second positions, respectively, of said no-load transfer switch.

15. The tap changer apparatus of claim 14 wherein the vacuum switching means and impedance means of the second circuits of the first and second movable contact arms are common to both circuits.

16. The tap changer apparatus of claim 15 wherein the predetermined sequence starts with the first and second circuits associated with one of the movable contact means being closed, and the first and second circuits associated with the other of the movable contact means being open, and wherein the means for switching the terminal means from one tap to another sequentially opens the first closed circuit, closes the initially open first circuit, opens the closed second circuit, and closes the initially open second circuit.

17. The tap changer apparatus of claim 13 wherein the vacuum switching means of the first circuits of the first and second movable contact means includes first and second vacuum switches, respectively.

18. The tap changer apparatus of claim 17 wherein the vacuum switching means of the second circuits associated with the first and second movable contact means is a third vacuum switch common to both circuits, and wherein the impedance means of the second circuits is a single impedance common to both circuits.

19. The tap changer apparatus of claim 18 wherein the predetermined sequence starts with the first and second circuits of one of the movable contact means being closed, and the first and second circuits of the other of the movable contact means being open, and wherein the means for switching the terminal means from one tap to another sequentially opens the first closed circuit, closes the initially open first circuit, opens the closed second circuit, and closes the initially open second circuit.

References Cited

UNITED STATES PATENTS

| | | | |
|---|---|---|---|
| 3,206,580 | 9/1965 | McCarty | 323—43.5X |
| 3,436,646 | 4/1969 | Prescott | 323—43.5 |
| 3,454,866 | 7/1969 | Beck et al. | 323—43.5 |
| 3,466,530 | 9/1969 | Matzl | 323—43.5 |

J D MILLER, Primary Examiner

G. GOLDBERG, Assistant Examiner

U.S. Cl. X.R.

323—47